United States Patent
Adegeest

[15] 3,655,047
[45] Apr. 11, 1972

[54] PROCESS FOR THE PURIFICATION OF WASTE WATER

[72] Inventor: Marco Adegeest, Zandvoort, Netherlands
[73] Assignee: Corodex, N.V., Zandvoort, Netherlands
[22] Filed: Nov. 6, 1970
[21] Appl. No.: 87,557

[52] U.S. Cl. ............................................210/59, 260/57
[51] Int. Cl. ......................................................C02c 5/02
[58] Field of Search ........................210/59, 62; 260/57 A, R

[56] References Cited

UNITED STATES PATENTS

| | | | |
|---|---|---|---|
| 3,226,318 | 12/1965 | Schick | 210/10 |
| 2,838,473 | 6/1958 | Partansky et al. | 260/57 A |
| 3,419,527 | 12/1968 | Akvtin et al. | 260/57 A |

Primary Examiner—Michael Rogers
Attorney—Synnestvedt & Lechner

[57] ABSTRACT

Removal of impurities from waste waters resulting from the manufacture of phenol/formaldehyde resins. Add at least one phenol to waste water, in quantity sufficient to bring phenol:formaldehyde molar ratio to from 1:1.02 to 1:1.12; adjust normality to from 0.015 to 0.10 N; heat for prolonged time at 80°–85° C., thus evaporating lower-boiling solvents; evaporate water at temperatures between 5° below boiling point of solution and 116° C.; recover liquid resin substantially free of resite, using finely divided air to aid evaporation of remaining solvents, if desired. Suitable apparatus includes a mixing tank with lines to feed it with contaminated water, acid, and phenol. The tank discharges to a heatable reservoir which has a gravity drain to a settling tank as well as an off-take for gaseous products and a bleed-off line from an intermediate zone for conveying fluids to an overflow tank. That tank has a return line to the reservoir and a gravity drain for liquid resin. It is connected also to an expansion boiler which is heated by fluid from heat exchange units. A stack removes vapor upwardly and a gravity drain conducts liquid resin downwardly to a storage vessel. A bleed-off line from an intermediate zone in the last mentioned drain to an acid recovery vessel may be added, if desired. Air injectors are installed as needed to maintain circulation.

7 Claims, 1 Drawing Figure

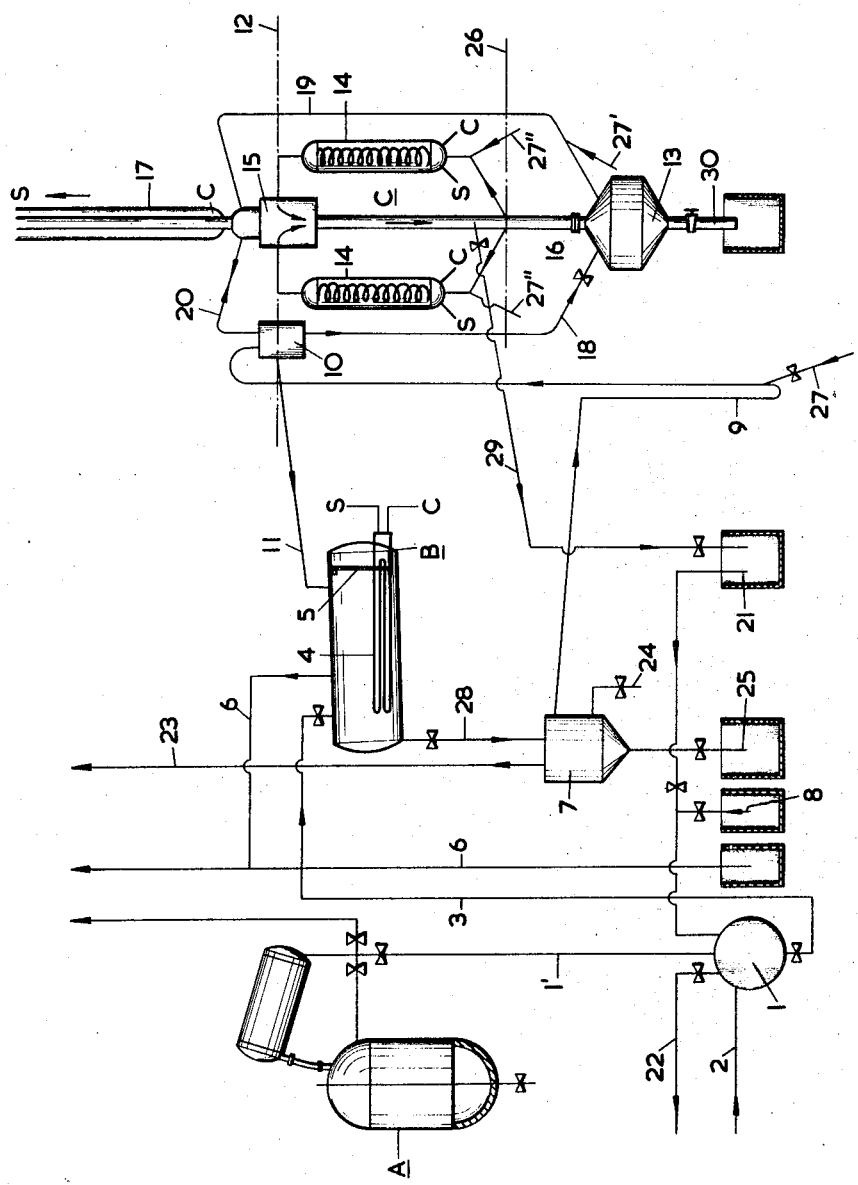

PROCESS FOR THE PURIFICATION OF WASTE WATER

The invention relates to a process and an apparatus for the purification of waste water in which one or more phenols and formaldehyde have been dissolved. The invention relates in particular to the purification of waste water produced in the preparation of phenol/formaldehyde resins.

Several prior proposals have been made for processes for the removal of phenols from waste water. In Kirk-Othmer's "Encyclopedia of Chemical Technology," volume 9, page 752, there has been described a process, for instance, which deals with the removal of complex phenolic impurities from water by means of ozone.

In Dutch Pat. No. 41,215 there has been described a process in which the phenols are removed by an extraction with trialkyl or triaryl phosphates.

In Dutch Pat. Nos. 50,394 and 49,032 there have been described processes in which the phenols are extracted with esters having a lower boiling point than said phenols and with diphenyl ether respectively.

In Dutch Pat. No. 109,068 there is described a process for the extraction of phenols from an aqueous solution by means of a solvent for phenols.

In Dutch Pat. No. 103,061 a process is described, whereby a solution of aqueous phenols is first extracted with cumene and then is precipitated with sodium hydroxide, as a result of which sodium phenolate is obtained.

Dutch Pat. No. 92,678 relates to a process in which waste water containing phenol is first treated with chlorine, as a result of which chlorophenols are obtained, and then extracted.

All these processes, however, relate to the removal of phenol only, whereas, when preparing phenol/formaldehyde resins, the waste water obtained contains phenols and also formaldehyde, and consists partly of a) water that is formed during the condensation step, b) the formaldehyde solution, c) the phenol, and d) the catalyst diluent. To recover the phenols and the formaldehyde, the water has to be removed by decanting, for instance, or by evaporating under reduced or normal pressure and re-condensing by means of a condenser.

If the waste water should be simply evaporated by heating the bottom and walls of a vessel, an unusable resin would be formed, which rapidly reaches the C-stage or resite phase, i.e., becomes an infusible and insoluble resin. In order to avoid this, and to develop a process that is both acceptable and economical, it is necessary for the waste water to be purified in such a way that the phenols and the formaldehyde are separated off by converting said products into low molecular resins, while the water is evaporated.

It has been found that waste water in which one or more phenols and formaldehyde have been dissolved may be purified by adding phenol(s) thereto in such quantities that the phenol:formaldehyde molar ratio will become from 1:1.02 to 1:1.12, and by adjusting the normality of the total acid to from 0.015 to 0.10 N; heating the solution at a temperature of 80° to 85° C., and subsequently removing the water by heating at a temperature that is at or above 5° C. below the boiling point of the liquid mixture.

The composition of the waste water is determined by the type of resin that was prepared. It will generally vary between the following limits:

3–7% by weight of phenols (normally ± 4%)
5–8% by weight of formaldehyde (normally ± 6%)
5–7% by weight of methanol (summer or winter formalin) and small percentages of: a) esters formed during the course of the reaction (b.p. ± 40° C.), b) organic chlorides, c) methylal (b.p. 44° C.) formed during the course of the reaction, and d) formic acid. The HCl normality (if HCl is used as a catalyst) of waste water to be purified is ± 0.015.

The process according to the present invention is carried out by adding phenol to the water.

The phenol:formaldehyde molar ratio is of the greatest importance. Said molar ratio, in the waste water, is generally 1:4.18, i.e. the percentage of formaldehyde is too high. By adding phenol the molar ratio is brought from 1:4.18 to from 1:1.02 to 1:1.12. The formaldehyde will now be bound by the phenol, as a result of which a thin, liquid resin mixture will be separated off, while the formation of very large resin molecules, i.e., a viscous resin is avoided.

Acid, preferably hydrogen chloride, is added in order to maintain the normality of the total acid between 0.015 and 0.10 N. Under such conditions a resin reaction is maintained that produces a non-adherent resin, so that the fouling of the apparatus is avoided.

The fluid is subsequently heated at ± 80°–85° C. for 30 hours or several days, so that part of the methanol and other volatile compounds formed (in which the resin produced would readily dissolve) will escape. As a result, the ratio of separation of resin is considerably improved. The methanol and other volatile substances evolved may be recovered. The separation of resin may be accelerated by injecting very finely divided air. Very finely divided air may be provided in this instance, by injecting air into the liquid through acid-resistant, sintered, porous filters.

The preliminary heating and evaporation of the volatile products is effected as near the surface of the liquid as possible, in order to prevent any turbulence from spreading through the entire quantity of liquid, and to give the formed resin the opportunity to settle in a zone which can be drained and is unheated. In this way further polymerization of the resin is prevented and the heat zone is kept substantially free from resin.

When the greater part of the liquid is free from methanol and other volatile substances, it is heated to at least 5° C. below the boiling point of the liquid mixture, so as to evaporate the water. The temperature may not be higher than 116° C., because at higher temperatures a gradual adherence of resite or C-stage resin occurs upon the heating surfaces, thus causing the rate of heat transfer to decrease within a short period of time and correspondingly causing evaporation to proceed at a slower rate. The evaporating surface of the source of heat has therefore to be such that at a steam temperature of below 116° C. the liquid to be afterreacted and pre-purified will keep on boiling.

The after-reaction thus completed will yield very small resin molecules having 2 to ± 6 nuclei, whereby it is observed that a four-nuclei molecule, for instance, is a molecule which contains 4 phenol and 3 formaldehyde units. Two-nuclei molecules, such as diphenyldihydroxymethane (in 6 isomers) may be observed as an emulsion of extremely fine crystals.

The resin obtained according to the procedure described above may be further processed without presenting any difficulties. It may be used, inter alia, in preparing usual Novolac resin, though in this instance there is less formaldehyde present in the recovered resin condensation mixture than in the prior process.

The process is preferably carried out in an apparatus which is schematically shown by the annexed drawing. A is the reaction vessel in which the resin is prepared.

The apparatus comprises a mixing tank 1 which is supplied through a pipe 1' with waste water to be purified. Vacuum created in the tank through vacuum line 22 draws in phenol through the suction line 8, and acid, preferably mixed with water, through the suction line 21. Appropriate valving is supplied for closing these suction lines when the mixing tank is to be emptied by means of pressure applied through pipe 2, which forces the water, phenol and acid through the pipe 3 to the reservoir B. 5 is a gauge-glass; S and C are, respectively, steam feed and steam discharge lines.

The reservoir B is installed at an inclination. It is equipped with a heating member 4 and it is connected at an upper point to the discharge pipe 6 for the removal of methanol vapor and other volatile compounds. Finely divided air may be forced into the tank through an air injector 5a. The pipe 28 carries fluid from the lower end of the reservoir B to a resin settling tank 7, which is connected to a pressure safety valve by way of line 23, and also has a gravity drain line 25 for removing the resin which has settled out in the lower levels of the tank. In line 28, near vessel B, means may be provided to introduce finely divided air into B. A drain 24 may be provided for removing fluid from the tank 7. A pipe 9 is connected to an upper portion of the settling tank 7 for removing lighter material from that tank.

An air injector 27 is connected into the pipe 9, and carries the fluid from the tank 7 to an overflow tank 10, from which fluid may be led back to the tank B by way of the overflow line 11. Heavier constituents of the material in the tank 10 may flow through the line 18 into the tank 13, where separated resin is collected. Lighter constituents in the tank 10 are carried to an expansion boiler or evaporator 15 by way of a line 20 equipped with a pressure equalizer. C is the after-reaction unit.

Between the expansion tank 15 and the separating tank 13 there is a primary circulating pipe 16 which interconnects these two vessels. At or about the level indicated by the broken line 26, indicating the interface of hot and cold zones, connections are provided from the line 16 to heat exchangers 14,14, these being supplied with fluid from the line 16 by the aid of air injectors 27'',27''. The point at which the connections to the heat exchangers come off is just slightly below the zone at which the hot and the lukewarm water meet in the pipe 16. Slightly above this level is connected the drain pipe 29, which withdraws water mixed with acid, and conveys it back to the tank from which the line 21 extends. A heated discharge pipe 17 leads from the top of the expansion tank 15 for the removal of volatile compounds.

There is a gauge 19 mounted between the tank 13 and the tank 15 for the purpose of checking on the fluid level. This gauge may be provided with an air injector 27'. At the bottom of the tank 13 there is a drain 30 for the removal and recovery of the liquid resin.

EXAMPLE 624 liters (683 kg.) of waste water, remaining after the preparation of a phenolformaldehyde resin which had been condensed in a basic medium, was admitted to the mixing tank together with 312 liters (341 kg.) of waste water resulting from the condensation of a phenolformaldehyde resin in an acidic medium. 84 liters (90 kg.) of water containing acid was mixed with these waste water portions, this water-containing acid having been drawn through the continuous drain 29 from the after-reactor of the evaporating plant. 109 kg. of phenol was added to this mixture.

Before the addition of phenol, the phenol:formaldehyde molar ratio was 0.43 gram mol per liter to 1.8 gram mol per liter, i.e., 1:4.18. This is 40.46 g. of phenol and 54 g. of formaldehyde per liter. After the addition of phenol the phenol:formaldehyde ratio was 0.57 gram mol per liter to 0.61 gram mol per liter, i.e., 1:1.07. This is 53.64 g. of phenol and 18.38 g. of formaldehyde per liter.

The normality of the total acid mounted to 0.015.

After the addition of phenol the mixture was held at a temperature of 80°–85° C. for 48 hours. The water was subsequently removed by being heated to boiling temperature.

There was thus obtained 200 kg. of a thin, liquid resin mixture which was separated off by settling.

Inasmuch as 109 kg. of phenol was added, there have thus been recovered 91 kg. of resin product (i.e., ± 8.8 percent by weight) from the acid waste water.

Subsequently, another 84 liters of water containing acid was obtained from the continuous drain 29 from the reaction-evaporation zone C. This water is required for maintaining the acidity in this zone at a constant level, while it also serves to adjust the acidity in the mixing tank.

I claim:

1. A process for the removal of phenol from waste water in which one or more phenols and formaldehyde have been dissolved, characterized by the steps of adding at least one phenol to such waste water until the phenol:formaldehyde molar ratio is brought to from 1:1.02 to 1:1.12; adding reagents as needed to adjust the total acid normality of the waste water to from 0.015 to 0.10 N; heating the solution for a prolonged interval at 80° to 85° C., and subsequently removing excess water by heating the liquid mixture to a temperature between its boiling point and 5° C. below its boiling point.

2. A process according to claim 1, characterized in that hydrogen chloride is used to adjust the normality of the acid.

3. A process according to claim 1, characterized in that very finely divided air is injected through the solution, so as to accelerate the removal therefrom of water and of such vaporizable impurities present as may be solvents for phenol/formaldehyde resins.

4. A process according to claim 1, characterized in that the heating at temperatures of from 80° to 85° C. is maintained for at least 30 hours.

5. A process according to claim 1, characterized in that excess water is removed from the liquid mixture by bringing it into contact with a surface which is heated to at least the temperature stated, but not above 116° C.

6. A process in accordance with claim 1 in which, at the end of the prolonged heating mentioned, liquid resin is removed from a lower zone in the heated solution to cool storage, volatilized constituents are removed from an upper zone, and water containing reagents added to adjust the normality is removed to an evaporating zone where it is subjected to temperatures sufficiently high to evaporate excess water, the liquid resin remaining being removed from the heated area to cool storage.

7. The process according to claim 6, wherein the evaporating step includes the recycling of water-containing fluids through heat exchange equipment back to the evaporating phase.

* * * * *

UNITED STATES PATENT OFFICE
CERTIFICATE OF CORRECTION

Patent No. 3,655,047　　　　　　　　Dated April 11, 1972

Inventor(s) Marco Adegeest

It is certified that error appears in the above-identified patent and that said Letters Patent are hereby corrected as shown below:

In the heading, below item [21], insert:

--[30] Foreign Application Priority Data

November 7, 1969　Netherlands　69.16843--

Signed and sealed this 9th day of January 1973.

(SEAL)
Attest:

EDWARD M. FLETCHER, JR.　　　　　　　　ROBERT GOTTSCHALK
Attesting Officer　　　　　　　　　　　Commissioner of Patent